United States Patent [19]

Anderson

[11] 4,130,232

[45] Dec. 19, 1978

[54] PROCESS PLUG FOR ULTRASONIC SOLDERING

[75] Inventor: Walter W. Anderson, Kettering, Ohio

[73] Assignee: General Motors Corporation, Detroit, Mich.

[21] Appl. No.: 745,578

[22] Filed: Nov. 29, 1976

[51] Int. Cl.² .............................................. B23K 1/08
[52] U.S. Cl. ..................................... 228/57; 228/183; 228/215; 138/89; 118/505
[58] Field of Search .................... 228/183, 215, 57; 138/89; 118/408, 429, 504–505

[56] References Cited

U.S. PATENT DOCUMENTS

| 1,931,311 | 10/1933 | Young | 228/215 X |
|---|---|---|---|
| 2,120,067 | 6/1938 | Gray et al. | 285/287 |
| 2,794,243 | 6/1957 | Schweller | 228/183 |
| 2,845,952 | 8/1958 | Hill | 138/89 |
| 3,551,995 | 1/1971 | Marechal | 228/183 X |
| 3,604,104 | 9/1971 | Glasgow | 228/183 X |
| 3,607,361 | 9/1971 | Hight | 118/408 |
| 3,817,210 | 6/1974 | Greever | 118/408 |

*Primary Examiner*—Al Lawrence Smith
*Assistant Examiner*—K. J. Ramsey
*Attorney, Agent, or Firm*—Edward P. Barthel

[57] ABSTRACT

An improved process plug for use during immersion soldering of aluminum heat exchanger coils, such as an air conditioner evaporator. The plug allows the solder to flow into an open bell or female socket of a suction header tube to "pretin" the internal finish of the bell or tube joint while preventing the solder bath from entering the coil. The process plug is designed to achieve a "short" or reduced area joint so that the plug can be readily removed by heating. The suction header tube joint is completed by hand soldering of a precoated male copper transition tube.

2 Claims, 4 Drawing Figures

PROCESS PLUG FOR ULTRASONIC SOLDERING

This invention relates to heat exchangers and more particularly to an improved process plug for pretinning the bellformed portion of leak-free soldered joints of all aluminum air conditioner coils.

The refrigeration art has long been faced with the problem of forming a soldered joint between aluminum coils and copper tubing. One method of making soldered joints is the subject of U.S. Pat. No. 3,760,481 to Greever, issued Sept. 25, 1973. The Greever patent discloses a process wherein prior to telescoping the joint members into assembled relation either one or both the members is coated with a layer of zinc solder so that after telescoping the members a layer of solder is disposed in the clearance space in the region of their overlap. As stated in the Greever patent the members are then partially submerged in a molten zinc solder bath and ultrasonic energy is applied only to the molten solder. The solder between the members is heated to its melting temperature which causes it to flow and break the surface tension at the interface with the solder bath so that the solder flows into and completely fills the clearance space between the joint members. The ultrasonic energy can then penetrate into the region between the two members to clean the surfaces of the members without any direct contact between the ultrasonic transducer and the members being joined. When the members are withdrawn from the molten solder, the solder solidifies between them to form a permanent joint. In such a process it is necessary to prevent the flow of the molten solder past the open bell portion of a certain non-vented tubular joint, for example the joint required between a copper transition tube and an aluminum manifold, during submergence while insuring that the inner surface of the bell is precoated or "pretinned" in preparation for a hand-soldered socket joint with the tubular precoated copper transition tube.

Accordingly, it is an object of the present invention to provide an improved process plug for pretinning the open bell portion of a heat exchanger coil joint wherein the socket bell and the plug cooperate during an immersion soldering operation to pretin the internal enlarged surface of the bell prior to the removal of the process plug thereby insuring the surface is coated with a layer of solder so that after insertion of the precoated male copper tubing, juxtaposed layers of solder are sealed in the interface area between the members. The process plug includes a rod-like handle portion and an enlarged plug portion with the plug portion having a longitudinal dimension shorter than the inner flared portion of the bell, whereby upon solder entering the open bell during immersion soldering it will join the plug head to the bell along the longitudinal dimension to form a readily heat separable "short joint" therebetween while preventing the solder to pass beyond the bell into the coil tubing.

Further objects and advantages of the present invention will be apparent from the following description, reference being had to the accompanying drawings wherein preferred embodiments of the present invention are clearly shown.

Figure 1:
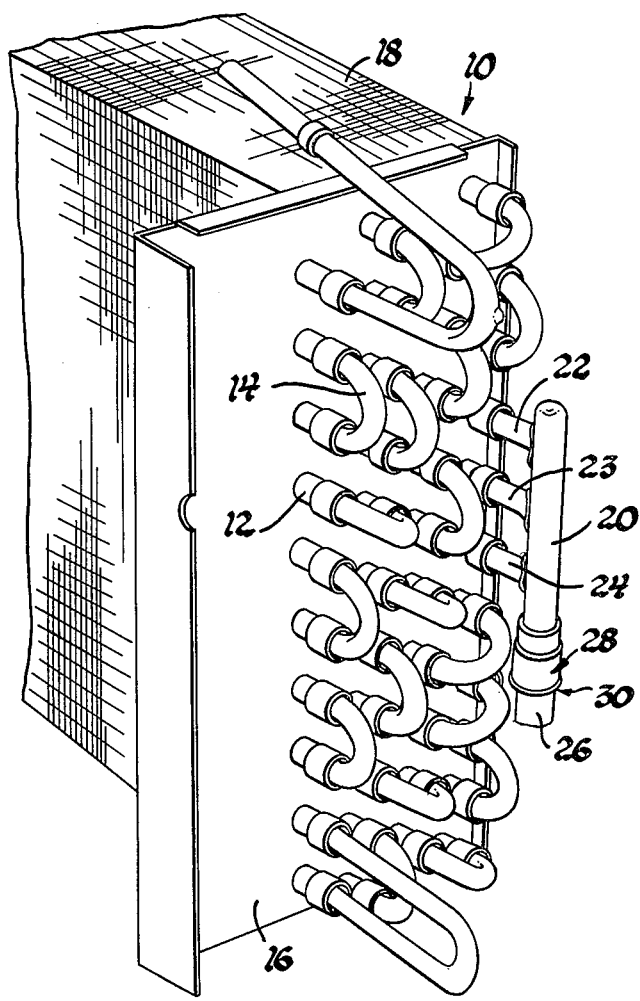
FIG. 1 is a perspective view of a heat exchanger embodying the principles of the present invention.

Referring now to the drawings, and in particular to FIG. 1 thereof, an air conditioner coil in the form of an all-aluminum evaporator unit, indicated generally by the number 10, having a conventional arrangement including a succession of aluminum coils or conduits 12 which have been jointed together or interconnected at one end by return or U-bend connectors 14. The coils are supported by end members, one of which is shown at 16, and are connected in heat conducting relationship to a plurality of vertically extending and horizontally spaced heat conducting fins 18. The coils 12, which are operative for containing a refrigeration fluid, are connected to an aluminum manifold 20 by means of a plurality of conduits 22, 23 and 24 at the right hand portion of the heat exchanger as viewed in FIG. 1, to provide a sinuous flow path for the fluid through the heat exchanger. The terminus of a copper crossover or transition tube, shown at 26, is telescoped into a widened socket portion or bell 28 to form a soldered joint, generally indicated at 30.

Figure 2:
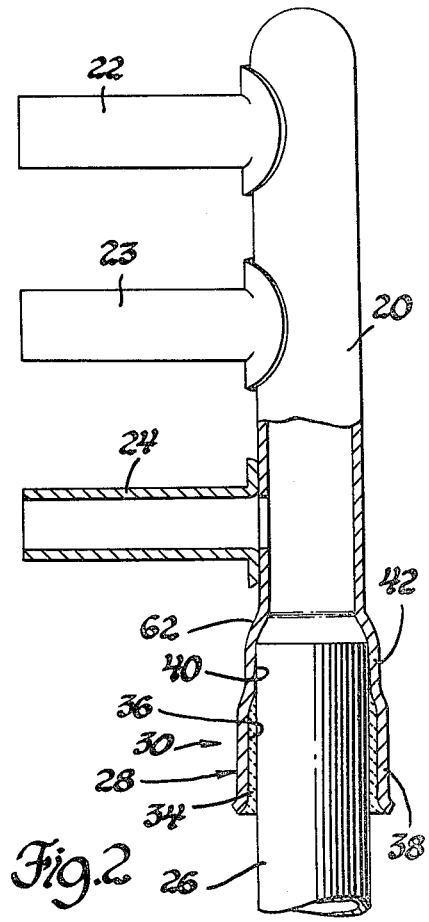
FIG. 2 shows an enlarged view of the header or manifold assembly of FIG. 1 with the joint between the aluminum header and a copper transition tube shown in cross section.

Considering now the soldered joint 30 of FIG. 2, it will be seen that the copper transition tube 26 is inserted into the bell 28, formed in the end of the manifold 20, with sufficient clearance so that they can be easily telescoped. As discussed in the aforementioned Greever patent, prior to telescoping, the inner surface of the bell must be coated or "pretinned" with a layer of suitable material such as zinc solder. In the disclosed form the zinc solder has a composition of about 95% zinc and 5% aluminum. The "pretinning" or precoating of an aluminum or copper member with the zinc solder can be accomplished most effectively by an ultrasonically activated bath, as discussed above in the Greever patent. The ultrasonic energy displaces the oxide layer normally adhering to the metal surface and causes a clean, oxide-free surface to which the solder adheres.

Applicant's invention concerns the need in the manufacture of aluminum evaporator coils to precoat the interior surface of the bell portion of an aluminum suction manifold tube during immersion soldering of the evaporator coil assembly. As seen in FIG. 2, it is necessary that the zinc solder metal 34 of the completed joint adhere to both the outer surface of the copper transition tube 26 and the inner coated surface of the manifold bell 28. To accomplish this it is essential that the solder coating include both the inner surface 36 of the lead-in or outer flared portion 38 and surface 40 of reduced friction fit or inner flared portion 42 of the bell 28.

Figure 3:
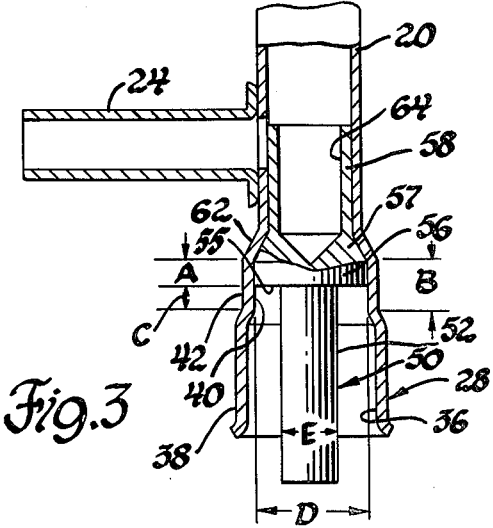
FIG. 3 is a sectional view of the bell portion of the header of FIG. 2 illustrating one step in the manufacture of the joint.

Applicant provides a removable plug member, generally indicated at 50 in FIG. 3, designed such that upon insertion in bell 28 it permits the flow of solder to both the bell interior surfaces 36 and 40 to precoat the same during immersion soldering prior to the removal of the plug 50 and the insertion of the transition tube portion 26 for completing the joint 30. It will be noted that various methods may be used to subsequently form the tubular joint 30. For example, the joint may be hand soldered by mating the precoated members 26 and 28, as shown in FIG. 2, reheating the joint as by a torch and applying ultrasonic energy to remove any oxide layers.

As best seen in FIG. 3, the process plug 50 includes a rod-like member 52 providing a handle portion, a cylindrical or plug head portion 56, a truncated cone portion 57 and a shank portion 58. It will be seen that the cylindrical plug portion 56 has a longitudinal dimension, indicated at "A", which is shorter than the inner reduced friction fit portion 42, indicated by dimension "B". In the disclosed form the dimension "B" is of the order of twice the dimension "A". Further, the internal diameter of friction fit portion 42 is substantially the same as the diameter "D" of the plug cylindrical portion 56 to provide a friction fit therebetween. The result is that solder entering the bell flared portion 38 during immersion soldering will join the plug head portion 56 to the area "A" of surface 40 to form a "short" or axially limited joint. It will be noted that while the plug joint is usually as described it will be appreciated that it could be either a portion of the interface along the longitudinal dimension "A" or a fillet joint (not shown) with plug shoulder 55. In either case, however, the plug 50 prevents solder from passing beyond the bell portion 42 into the interior of the manifold 20.

Applicant's novel design includes the plug rod-like member 52 having a predetermined diameter "E", which is of the order of one-half the internal diameter of bell surface 40, providing sufficient clearance between the rod 52 and the bell to allow solder to readily flow between rod 52 and surface 40. The result is that the portion of the internal surface 40, delineated by dimension "C", is coated with solder during the immersion process without forming an extended joint between the plug rod-like member 52 and the bell interior surface 40 which could not be readily separated.

Figure 4:
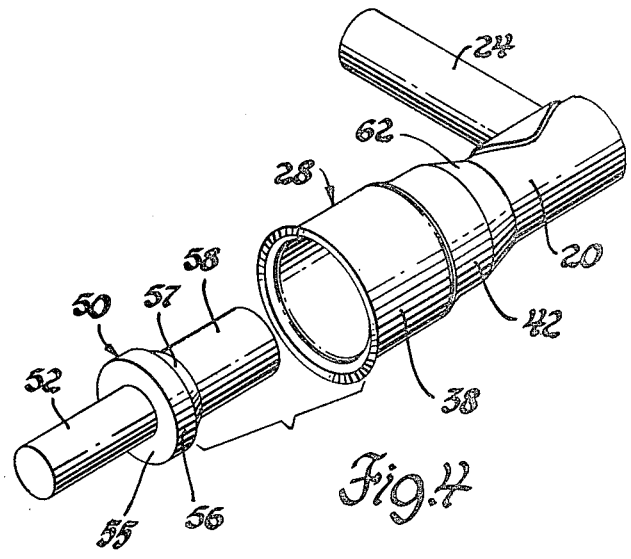
FIG. 4 is a fragmentary exploded perspective view of FIG. 3 illustrating a second step in the manufacture of the joint showing the process plug removed.

Thus, upon the bell 28 being reheated after the evaporator is withdrawn from the bath, solder is caused to melt along the "short joint", defined by axial dimension "A", to achieve easy separation of the plug 50 from the bell 28 by reheating while attaining a solder coating on the portion of the internal surface of the bell 28 denoted by dimension "C". After the removal of the plug 50, as shown in FIG. 4, the copper transition tube 26 is inserted or mated into the bell 28 and the parts heated by suitable means to complete the soldered joint 30 shown in FIG. 2.

As best seen in FIG. 3, the frusto-conical plug portion 57 is shaped to substantially conform with the socket bell outwardly projecting flange portion 62. Further, the shank portion 58 has an axial open-ended bore 64 extending substantially throughout its length to accelerate the heat transfer time interval of the plug 50. The shank portion 58 additionally serves as a lead-in for quick insertion of the plug in the bell while maintaining proper axial alignment of the plug 50 with the tube 20.

It will be noted that while applicant's process plug in the disclosed form is made from aluminum to provide good heat transfer for ready separation from the bell 28 upon heating it will be understood that other materials, such as iron plated with stainless steel, for example, could be used without departing from the scope of the invention.

While the embodiment of the present invention as herein disclosed constitutes a preferred form, it is to be understood that other forms might be adopted.

I claim:

1. For use during immersion soldering of a heat exchanger, a processing combination comprising an aluminum process plug and an aluminum enlarged bell-type female portion having a coatable characteristic for subsequently telescopically receiving a non-aluminum male pretinned tubing portion for completing a permanent joint on the heat exchanger, and wherein the female portion and said process plug cooperate during said immersion soldering because of such coatable characteristic to tin the internal enlarged surface of said female portion prior to the removal of said process plug and the insertion of said male pretinned tubing portion for completing said permanent joint, said process plug comprising a rod-like member forming a handle portion and a plug head portion, said plug head portion having a longitudinal dimension shorter than said enlarged female portion and a lateral dimension substantially the same as the internal surface of said enlarged female portion so that solder entering said enlarged female portion during said immersion soldering will join said plug head portion to said enlarged female portion along said longitudinal dimension to form a short separable joint therebetween without passing beyond said enlarged female portion into said heat exchanger, said handle portion having a lateral dimension less than the internal surface of said enlarged female portion and thereby spaced therefrom so that said internal surface is tinned during said immersion soldering without forming a joint between said handle portion and said enlarged female portion, and whereby said enlarged female portion is reheatable after said immersion soldering to melt the solder along said short joint to facilitate the easy separation of said plug head portion from said enlarged female portion while retaining the tinning on the internal surface of said enlarged female portion.

2. An improved process plug for use during immersion soldering of a heat exchanger which is adapted to include a joint having an enlarged bell-type female portion for telescopically receiving a male tubing portion and wherein the female portion and the plug are aluminum and cooperate during said immersion soldering to tin the internal surface of said enlarged female portion prior to the removal of said plug and the insertion of said male tubing portion for completing said joint, said process plug comprising a rod-like member having a handle portion and a plug portion, said plug portion including an outer head and an inner guide shank of reduced diameter joined by an intermediated portion of frustum configuration, said head having a longitudinal dimension shorter than said enlarged female portion and a lateral dimension substantially the same as the internal surface of said enlarged female portion so that solder entering said enlarged female portion during said immersion soldering will join said plug head to said enlarged female portion along said longitudinal dimension to form a short joint therebetween without passing beyond said enlarged female portion into said heat exchanger, said shank portion having an axial open ended bore extending substantially throughout its length thereby accelerating the heating and cooling periods of said joint, said handle portion having a lateral dimension less than the internal surface of said enlarged female portion and thereby spaced therefrom so that said internal surface may be tinned during said immersion soldering without forming a joint between said handle and said enlarged female portion, whereby said enlarged female portion may be reheated after said immersion soldering to melt the solder along said short joint to facilitate the easy separation of said plug head from said enlarged female portion while retaining the tinning on the internal surface of said enlarged female portion.

* * * * *